(12) United States Patent
Kuehne et al.

(10) Patent No.: US 10,248,193 B2
(45) Date of Patent: Apr. 2, 2019

(54) METHODS AND SYSTEM FOR OPERATING A PLURALITY OF DISPLAY DEVICES OF A MOTOR VEHICLE, AND MOTOR VEHICLE HAVING A SYSTEM FOR OPERATING A PLURALITY OF DISPLAY DEVICES

(71) Applicant: AUDI AG, Ingolstadt (DE)

(72) Inventors: Marcus Kuehne, Beilngries (DE); Ulrich Mueller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 290 days.

(21) Appl. No.: 15/021,245

(22) PCT Filed: Sep. 11, 2014

(86) PCT No.: PCT/EP2014/002456
§ 371 (c)(1),
(2) Date: Mar. 10, 2016

(87) PCT Pub. No.: WO2015/036117
PCT Pub. Date: Mar. 19, 2015

(65) Prior Publication Data
US 2016/0224107 A1    Aug. 4, 2016

(30) Foreign Application Priority Data
Sep. 13, 2013   (DE) .................. 10 2013 015 205

(51) Int. Cl.
*G06F 3/01*      (2006.01)
*B60K 35/00*     (2006.01)
(Continued)

(52) U.S. Cl.
CPC .............. *G06F 3/013* (2013.01); *B60K 35/00* (2013.01); *G06F 3/0484* (2013.01);
(Continued)

(58) Field of Classification Search
CPC ....................................................... G06F 3/013
See application file for complete search history.

(56) References Cited

U.S. PATENT DOCUMENTS

| 6,577,329 B1 * | 6/2003 | Flickner ................. G06Q 30/02 715/774 |
| 2008/0240519 A1 * | 10/2008 | Nagamitsu .............. G06F 3/012 382/118 |

(Continued)

FOREIGN PATENT DOCUMENTS

| DE | 10121392 A1 | 11/2002 |
| DE | 102006050016 A1 | 4/2008 |

(Continued)

OTHER PUBLICATIONS

WIPO translation of International Preliminary Examination Report on Patentability for PCT/EP2014/002456 dated Mar. 17, 2016.

(Continued)

*Primary Examiner* — William Boddie
*Assistant Examiner* — Andrew B Schnirel
(74) *Attorney, Agent, or Firm* — Staas & Halsey LLP

(57) ABSTRACT

In a motor vehicle having a plurality of display devices, a gaze direction of a driver of the motor vehicle is detected and used to check whether the driver has directed his gaze to a display region of the display devices for at least a predefined gazing duration. If the gaze has been directed to one of the display regions of one of the display devices for at least the predefined gazing duration, an interaction mode of an operating device for controlling the relevant display device is activated. An extended gazing duration which is longer than the predefined gazing duration is predefined for at least one of the display devices and for this display device, the interaction mode is activated only if it has been detected that the gaze of the driver has been directed to the display (Continued)

region of this display device for at least the extended gazing duration.

4 Claims, 1 Drawing Sheet

(51) Int. Cl.
  *G06F 3/0484* (2013.01)
  *G06F 3/14* (2006.01)
  *G09G 5/14* (2006.01)
(52) U.S. Cl.
  CPC ............ *G06F 3/1423* (2013.01); *G09G 5/14* (2013.01); *B60K 2350/1012* (2013.01); *B60K 2350/2013* (2013.01); *B60K 2350/906* (2013.01); *G09G 2380/10* (2013.01)

(56) References Cited

U.S. PATENT DOCUMENTS

| | | | |
|---|---|---|---|
| 2009/0167682 A1* | 7/2009 | Yamashita | G01C 21/36 345/158 |
| 2010/0238280 A1* | 9/2010 | Ishii | B60K 35/00 348/77 |
| 2012/0215403 A1 | 8/2012 | Tengler et al. | |
| 2012/0300061 A1* | 11/2012 | Osman | G06F 1/3231 348/135 |
| 2013/0063596 A1* | 3/2013 | Ueda | B60R 16/02 348/148 |
| 2014/0344012 A1* | 11/2014 | Kamhi | G06F 3/14 705/7.29 |

FOREIGN PATENT DOCUMENTS

| | | |
|---|---|---|
| DE | 102007025531 A1 | 12/2008 |
| DE | 102007049710 A1 | 4/2009 |
| DE | 102012006966 A1 | 11/2012 |
| DE | 102013015205.4 | 9/2013 |
| EP | 1 562 102 A2 | 8/2005 |
| EP | 2 390 139 A1 | 11/2011 |
| WO | PCT/EP/2014/002456 | 9/2014 |

OTHER PUBLICATIONS

Decision to Grant for German Appln. No. 102013015205.4 dated Oct. 17, 2014.
International Search Report for PCT/EP2014/002456 dated Jan. 5, 2015.
Huckauf et al.; "Object Selection in Gaze Controlled Systems: What You Don't Look at Is What You Get"; ACM Transactions on Applied Perception; vol. 8; No. 2; Jan. 2011; Article 13; 2 pp.
Office Action dated Nov. 16, 2017 in corresponding Chinese Application No. 201480050166.2, 8pp.

* cited by examiner

METHODS AND SYSTEM FOR OPERATING A PLURALITY OF DISPLAY DEVICES OF A MOTOR VEHICLE, AND MOTOR VEHICLE HAVING A SYSTEM FOR OPERATING A PLURALITY OF DISPLAY DEVICES

CROSS REFERENCE TO RELATED APPLICATIONS

This application is the U.S. national stage of International Application No. PCT/EP2014/002456, filed Sep. 11, 2014 and claims the benefit thereof. The International Application claims the benefit of German Application No. 102013015205.4 filed on Sep. 13, 2013, both applications are incorporated by reference herein in their entirety.

BACKGROUND

Described below are a method and a system for operating a plurality of display devices of a motor vehicle and a motor vehicle having such a system for operating a plurality of display devices.

DE 10 2012 006 966 A1 shows a method for triggering a function which can be carried out in the vehicle by gaze-controlled operation by a driver of the motor vehicle. A gaze detection device is used to check whether the driver has directed his gaze to a particular region of a display area of an operating panel. If it has been determined that the gaze is turned in this manner, a function which can be carried out in the vehicle and is associated with the operating panel is carried out. The display area can be deactivated in this case as soon as it has been detected that the gaze is averted from the corresponding display area.

DE 10 2007 049 710 A1 shows a method for visually triggering processes in a motor vehicle. An operating element is automatically initiated as soon as it has been detected that a vehicle occupant has directed his gaze to the operating element of the motor vehicle for a predefined duration.

DE 101 21 392 A1 shows an apparatus for controlling devices using the gaze direction. A detected gaze direction can be used as a basis for selecting a control function which can be carried out using an operating element that may be arranged on a steering wheel.

EP 1 562 102 A2 shows a motor vehicle with function triggering by gaze selection. An operating element can be activated as soon as it has been detected that a vehicle occupant turns his gaze to the operating element.

DE 10 2007 025 531 A1 shows a display system controlled by the gaze direction and a display method controlled by the gaze direction for a motor vehicle. In this case, respectively displayed information can be changed on the basis of a detected gaze direction duration.

SUMMARY

Described below is a method to improve the operation of a plurality of display devices of a motor vehicle on the basis of the gaze direction.

In the method described below for operating a plurality of display devices, a gaze direction of a driver of the motor vehicle is detected. The detected gaze direction is used to check whether the driver has directed his gaze to a display region of the display devices for at least a predefined gazing duration. If the gaze has been directed to one of the display regions of one of the display devices for at least the predefined gazing duration, an interaction mode is activated in which an operating device for controlling the relevant display device is activated. The method is distinguished by the fact that an extended gazing duration which is longer than the predefined gazing duration is predefined for at least one of the display devices. In the case of this display device, the interaction mode is activated only if it has been detected that the gaze of the driver has been directed to the display region of this display device for at least the extended gazing duration.

The method provides for an extended gazing duration to be predefined for at least one of the display devices, as a result of which the relevant interaction mode for this display device is activated only if the driver has directed his gaze to the relevant display region of the display device for at least the extended gazing duration. As a result of the fact that at least two gazing durations of different lengths are predefined, the activation of the relevant interaction modes on the basis of the gaze direction can be adapted to a common gaze behavior of the driver. As a result, interaction with the relevant display devices on the basis of the gaze direction becomes more robust since the probability of the interaction mode of the display device being inadvertently started or activated can be considerably reduced with the extended gazing duration.

In the method, it is not just the relevant display device itself which is controlled in the respective interaction mode. The respective display devices are used as a user interface for one or more different functions of the motor vehicle, for example in the form of an on-board computer, a navigation device, a radio or the like. In the interaction mode, provided that it is activated, the driver can therefore use the operating device to control respective vehicle functions via the corresponding display device, the relevant display device visualizing the control options and the control operations which are possibly carried out.

An advantageous configuration provides for the extended gazing duration to be predefined only for that display device whose display region is arranged completely above a lower edge of a windshield of the motor vehicle. The extended gazing duration may be predefined for a display device of the motor vehicle which is in the form of a head-up display. A driver's gaze usually moves relatively frequently across the windshield and therefore also across a display region of a head-up display without the driver wishing to interact with the head-up display itself. As a result of the fact that the extended gazing duration is predefined for the head-up display, inadvertent or undesirable starting of the interaction mode for the head-up display is avoided. The driver can therefore look through the windshield of the motor vehicle and in the process can also direct his gaze to the display region of the head-up display without the interaction mode of the head-up display being immediately activated.

An advantageous configuration provides for an average gazing duration, which is longer than the predefined gazing duration and shorter than the extended gazing duration, to be predefined for that display device whose display region is arranged only partially above a lower edge of a windshield. The average gazing duration may be predefined for a display device arranged above a center console of the motor vehicle. It may indeed be the case that the driver's gaze also moves across the relevant display region of the display device arranged above the center console of the motor vehicle when looking through the windshield without the driver wishing to interact with the relevant display device. The fact that a somewhat extended gazing duration in the form of the average gazing duration is predefined for this display device prevents the corresponding interaction mode from being activated without the driver actually wishing to interact with the relevant display device in the region of the center console of the motor vehicle.

Another advantageous embodiment provides for the predefined gazing duration to be predefined for a display device which is in the form of a combination instrument. In other words, the shortest gazing duration which must be detected before the relevant interaction mode is activated is predefined for the combination instrument. This is because the driver usually deliberately looks at the relevant display region of the combination instrument and also for longer if he actually wishes to interact with the combination instrument.

Another advantageous embodiment provides for the respective gazing durations to be changed on the basis of a driving speed of the motor vehicle. In other words, the corresponding gazing durations both for the head-up display of the display device arranged in the region of the center console of the motor vehicle and for the combination instrument can therefore be changed on the basis of the driving speed of the motor vehicle. If, in the case of a relatively high traffic density, for example, the driver moves the motor vehicle very quickly across a freeway, the driver will look through the windshield relatively quickly again after turning his gaze to the display region of the combination instrument, for example, and will possibly also at least briefly focus on the display region of the head-up display. The interaction with the respective display regions or display devices on the basis of the gaze direction can be improved by accordingly adapting the respective gazing durations.

The system described below for operating a plurality of display devices of a motor vehicle has a gaze detection device which is designed to detect the gaze direction of a driver of the motor vehicle and to use the detected gaze direction to check whether the driver has directed his gaze to a display region of the display devices for at least a predefined gazing duration. The system also has a control device which is designed to activate an interaction mode, in which an operating device of the system for controlling the relevant display device is activated, if it is determined that the gaze of the driver is turned to one of the display regions of one of the display devices for at least the predefined gazing duration. The system described below is distinguished by the fact that the control device is designed to predefine an extended gazing duration which is longer than the predefined gazing duration for at least one of the display devices. In the case of this display device, the control device is designed to activate the interaction mode only if it has been detected that the gaze of the driver has been directed to the display region of this display device for at least the extended gazing duration. Advantageous configurations of the method can be considered to be advantageous configurations of the system, in which case the system includes means for carrying out the method.

BRIEF DESCRIPTION OF THE DRAWINGS

Further advantages, features and details of the invention emerge from the following description of an exemplary embodiment and on the basis of the drawings. The features and combinations of features mentioned in the description above and the features and combinations of features mentioned in the description of the figures below and/or shown in the figures alone can be used not only in the respectively stated combination but also in other combinations or alone without departing from the scope of the invention.

For a further description, reference is made to the exemplary embodiments in the accompanying drawings of which.

DETAILED DESCRIPTION OF THE PREFERRED EMBODIMENT

Figure 1:
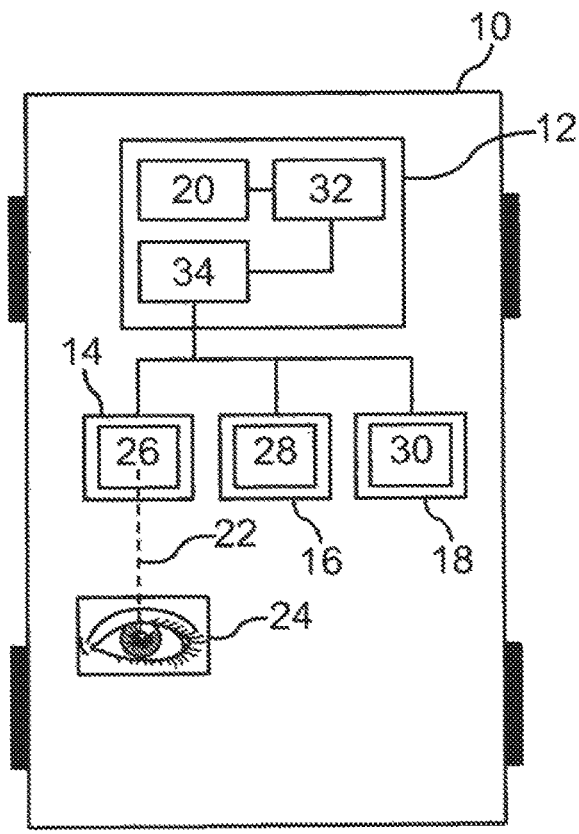
FIG. 1 is a schematic block diagram of a motor vehicle having a system for operating a plurality of display devices, the system including a gaze detection device for detecting a gaze direction of a driver of the motor vehicle and a control device as well as an operating device for controlling the respective display devices.

Reference will now be made in detail to the preferred embodiments, examples of which are illustrated in the accompanying drawings, wherein like reference numerals refer to like elements throughout.

A motor vehicle 10 having a system 12 for operating a plurality of display devices 14, 16, 18 is shown in a schematic illustration in FIG. 1. The system 12 has a gaze detection device 20 which is designed to detect a gaze direction 22 of a driver 24 of the motor vehicle 10, which gaze direction is indicated using the dashed line, and to use the detected gaze direction 22 to check whether the driver 24 has directed his gaze to one of the display regions 26, 28, 30 of the display devices 14, 16, 18 for at least a predefined gazing duration. The gaze detection device 20 may be, for example, in the form of a camera system having one or more cameras which are arranged in the interior of the motor vehicle 10 and can be used to detect the gaze direction 22 of the driver 24.

The system 12 also has a control device 32 which is designed to activate an interaction mode, in which an operating device 34 for controlling the relevant display device 14, 16, 18 is activated, if it is determined that the gaze of the driver 24 is turned to one of the display regions 26, 28, 30 of one of the display devices 14, 16, 18 for the at least predefined gazing duration. In this case, the control device 32 is coupled to the gaze detection device 20, thus ensuring a corresponding flow of information from the gaze detection device 20 to the control device 32.

The control device 32 is designed to predefine an extended gazing duration which is longer than the predefined gazing duration for at least one of the display devices 14, 16, 18. In the case of this display device 14, 16, 18, the control device 32 is designed to activate the interaction mode only if it has been detected that the gaze of the driver 24 has been directed to the display region 26, 28, 30 of this display device 14, 16, 18 for at least the extended gazing duration.

Figure 2:
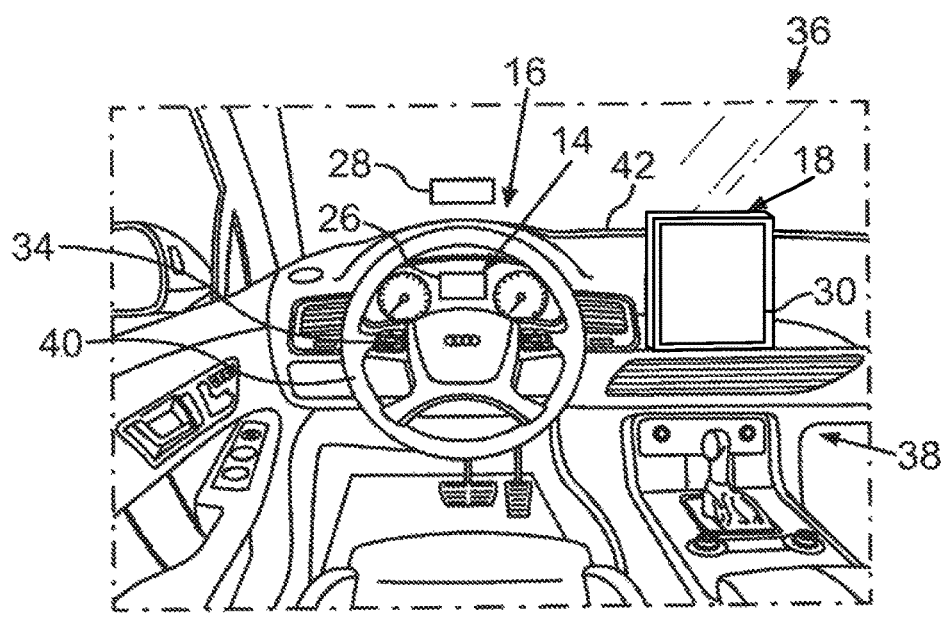
FIG. 2 is a perspective view of a partially illustrated cockpit of the motor vehicle, the display devices being in the form of a combination instrument, a head-up display and a display above a center console of the motor vehicle.

FIG. 2 illustrates a perspective view of a section of a cockpit 36 of the motor vehicle 10. In the present case, the display device 14 is a combination instrument of the motor vehicle 10, the display device 16 is a head-up display of the motor vehicle 10 and the display device 18 is a display which is arranged above a center console 38 of the motor vehicle 10. In the present case, the operating device 34 is in the form of a cylindrical operating device which is arranged on a steering wheel 40 of the motor vehicle 10.

A method for operating the display device 14, 16, 18 is explained below. The gaze detection device 20 is used to continuously detect the gaze direction 22 of the driver 24. The detected gaze direction 22 is used to check whether the driver 24 has directed his gaze to the display region 26 of the combination instrument 14 for at least a predefined gazing duration, has directed his gaze to the display region 28 of the head-up display 16 for an extended gazing duration or has directed his gaze to the display region 30 of the display 18 for an average gazing duration. In this case, the average gazing duration is shorter than the extended gazing duration and longer than the predefined gazing duration.

The extended gazing duration is therefore predefined only for the head-up display 16 whose display region 28 is arranged completely above a lower edge of a windshield (not described in any more detail) of the motor vehicle 10, which lower edge is indicated using the dashed line 42. In the present case, the display region 30 of the display 18 is arranged only partially above the lower edge 42 of the windshield of the motor vehicle 10 here.

It is initially assumed below that the driver 24 has directed his gaze to the display region 26 of the combination instrument 16 for the predefined gazing duration. As soon as this has been detected using the detected gaze direction of the driver 24, that interaction mode in which the operating device 34 is designed to control the combination instrument 14 is activated. As soon as this interaction mode for the combination instrument 14 has been activated, the driver can control the combination instrument 14 and correspondingly displayed contents inside the display region 26 by appropriately actuating the operating device 34. In this case, the combination instrument 14 is used as a graphical user interface for controlling a radio, an on-board computer, a navigation unit or other functional units of the motor vehicle 10, for example.

If, after activating the relevant interaction mode for the combination instrument 14, the driver 24 then averts his gaze from the combination instrument 14 or the display region 26 of the combination instrument 14 in order to briefly observe the traffic situation through the windshield of the motor vehicle 10, for example, and in the process glances at the display region 28 of the head-up display, the interaction mode for the head-up display 16 is not automatically activated. This is because, as already mentioned, an extended gazing duration which is longer than the predefined gazing duration for the combination instrument 14 is predefined for the head-up display 16. For example, the extended gazing duration may be predefined to be twice as long as the predefined gazing duration for the combination instrument 14, with the result that the driver 24 must direct his gaze to the display region 28 for 3 seconds, for example, before the interaction mode for the head-up display 16 is actually activated, whereas the driver 24 must direct his gaze to the display region 26 of the combination instrument 14 only for 1.5 seconds before the interaction mode for the combination instrument 14 is activated.

After activating the relevant interaction mode for the combination instrument 14 in a manner controlled by the gaze direction, the driver can therefore definitely look through the windshield and also at the display region 28 of the combination instrument for a short period without the interaction mode for the combination instrument 14 being terminated.

In contrast, if the driver 24 directs his gaze to the display region 28 of the head-up display 16 for longer than the 3 seconds mentioned, for example, the control device 32 causes the relevant interaction mode for the head-up display 16 to be activated and causes the interaction mode for the combination instrument 14 to be terminated. The driver 24 can then control the head-up display 16 by appropriately actuating the operating device 34, the head-up display 16 again being used as a graphical user interface for controlling a wide variety of functions of the motor vehicle 10, for example the navigation device, the radio, the on-board computer or the like.

If, after activating the interaction mode for the head-up display 16, it is determined that the driver 24 has then directed his gaze to the display region 30 of the display 18 for the average gazing duration which is shorter than the extended gazing duration for the head-up display 16 and longer than the predefined gazing duration for the combination instrument 14, the interaction mode for the head-up display 16 is terminated or deactivated again and the corresponding interaction mode for the display 18 is activated, in which the driver 24 can again control the display 18 by appropriately operating the operating device 34. In this case, the display 18 is then again used as a graphical user interface for controlling corresponding functional units of the motor vehicle, for example the navigation system, the radio, the on-board computer or the like.

Respective interaction modes for the different display devices 14, 16, 18 can therefore be activated in a manner controlled by the gaze direction, in which case the required gazing durations, which must have been detected before the corresponding interaction modes are activated, are predefined to have different lengths for the different display devices 14, 16, 18. In this case, the respectively required gazing durations are adapted in such a manner that they take into account the gazing durations of the driver 24 which are respectively different for the combination instrument 14, the head-up display 16 and the display 18 in the present case.

In the present case, the required gazing duration for activating the relevant interaction mode for the head-up display 16 is therefore selected to be the longest since the driver 24 will usually direct his gaze very frequently through the windshield of the motor vehicle 10 and will therefore also direct his gaze to the display region 28 of the head-up display 16 without the driver 24 actually wishing to interact with the head-up display 16. It is normally also often the case with a typical visual behavior of the driver 24 that the driver 24 glances at least at the display region 30 of the display 18 above the center console 38 without the driver 24 actually wishing to interact with the display device 18. This is different with the combination instrument 14 in comparison with the head-up display 16 and the display 18 since the driver 24 will usually deliberately direct his gaze to the display region 26 of the combination instrument 14 if he wants corresponding interaction.

The explained method and system therefore make it possible to control the respective display device 14, 16, 18 on the basis of the gaze direction in a particularly robust manner since the respective gazing durations are predefined to be different on the basis of a typical gazing behavior of the driver 24 in such a manner that the corresponding interaction modes are usually also activated only when the driver 24 actually wants this.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating display devices of a motor vehicle, each of the display devices having a display region, said method comprising:
    detecting a gaze direction of a gaze of a driver of the motor vehicle;
    using the gaze direction to check whether the gaze of the driver has been directed to the display region of one of the display devices for at least a predefined gazing duration;
    activating an interaction mode, when the gaze of the driver has been directed to the display region of the one of the display devices for at least the predefined gazing duration, an operating device for controlling the one of the display devices being activated in the interaction mode;
    storing an extended gazing duration, longer than the predefined gazing duration, the extended gazing duration being predefined for a head-up display device, the display region of the head-up display device being arranged completely above a lower edge of a windshield of the motor vehicle;
    changing respective gazing durations of the display devices based on a driving speed of the motor vehicle; and
    activating the interaction mode of the head-up display device only upon detection of the gaze of the driver directed to the display region of the head-up display device for at least the extended gazing duration.

2. The method as claimed in claim 1, wherein an average gazing duration, longer than the predefined gazing duration and shorter than the extended gazing duration, is predefined for a lower display device, the display region of the lower display device being arranged only partially above the lower edge of the windshield of the motor vehicle.

3. The method as claimed in claim 2, wherein the lower display device is arranged above a center console of the motor vehicle.

4. The method as claimed in claim 1, wherein the predefined gazing duration is predefined for a combination instrument included among the display devices.

* * * * *